US010103576B2

(12) United States Patent
Schroeder et al.

(10) Patent No.: US 10,103,576 B2
(45) Date of Patent: Oct. 16, 2018

(54) METHOD AND SYSTEM FOR CONTROL POWER IN REMOTE DC POWER SYSTEMS

(71) Applicant: General Electric Company, Schenectady, NY (US)

(72) Inventors: Stefan Schroeder, Bavaria (DE); Christof Martin Sihler, Bavaria (DE); Sebastian Pedro Rosado, Bayern (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 64 days.

(21) Appl. No.: 15/241,968

(22) Filed: Aug. 19, 2016

(65) Prior Publication Data

US 2016/0359365 A1 Dec. 8, 2016

Related U.S. Application Data

(62) Division of application No. 12/976,106, filed on Dec. 22, 2010, now Pat. No. 9,450,412.

(51) Int. Cl.
*H02J 3/00* (2006.01)
*H02J 1/00* (2006.01)
(Continued)

(52) U.S. Cl.
CPC ............ *H02J 13/0096* (2013.01); *H02J 3/01* (2013.01); *H02J 3/36* (2013.01); *H02J 11/00* (2013.01); *Y02E 60/60* (2013.01); *Y10T 307/445* (2015.04)

(58) Field of Classification Search
CPC ........ H02J 1/00; H02J 7/00; H02J 3/00; H02J 3/36; G05F 1/24; H02M 5/44;
(Continued)

(56) References Cited

U.S. PATENT DOCUMENTS 4,156,150 A * 5/1979 Harrigan .................. G05F 1/10
307/2
6,519,169 B1  2/2003 Asplund et al.
(Continued)

FOREIGN PATENT DOCUMENTS

EP    1316672 A1    6/2003
EP    1385259 A2    1/2004
(Continued)

OTHER PUBLICATIONS

Dao-Lian et al., "Differential Forward DC-DC Converter Mode Inverter With High Frequency Link", Proceedings of The CSEE, vol. No. 30, Issue No. 9, pp. 20-25, Mar. 25, 2010.
(Continued)

*Primary Examiner* — Rexford Barnie
*Assistant Examiner* — Jagdeep Dhillon
(74) *Attorney, Agent, or Firm* — GE Global Patent Operation; Pabitra Chakrabarti

(57) ABSTRACT

A method and system for a control power supply system is provided. The control power supply system includes a first conductor configured to carry a direct current (DC) electrical current from a source to a load, a second conductor configured to carry the DC electrical current from the load to the source, and an AC power source coupled to at least one of the first and the second conductors, the AC power source configured to superimpose a selectable relatively high frequency AC component onto the DC electrical current to generate a composite power signal.

12 Claims, 7 Drawing Sheets

(51) Int. Cl.
  *H02J 13/00* (2006.01)
  *H02J 3/36* (2006.01)
  *H02J 11/00* (2006.01)
  *H02J 3/01* (2006.01)

(58) Field of Classification Search
  CPC . H02M 7/42; H02P 1/00; H05B 37/36; H05B 39/105; H01K 1/625; H01K 1/70; H01R 13/514
  USPC ..... 307/36, 39, 125, 44, 80, 82; 363/39, 59; 323/288, 267, 124, 207; 322/24
  See application file for complete search history.

(56) References Cited

U.S. PATENT DOCUMENTS

| | | | |
|---|---|---|---|
| 6,643,151 B1 * | 11/2003 | Nebrigic | H01M 6/5044 307/110 |
| 7,633,770 B2 | 12/2009 | Datta et al. | |
| 2003/0090244 A1 | 5/2003 | Shenai et al. | |
| 2004/0022077 A1 * | 2/2004 | Steigerwald | H02J 1/02 363/39 |
| 2004/0075600 A1 * | 4/2004 | Vera | H02J 1/102 341/166 |
| 2004/0114291 A1 | 6/2004 | Llg et al. | |
| 2004/0218318 A1 | 11/2004 | Bijlenga et al. | |
| 2005/0047044 A1 * | 3/2005 | Nolden | H02M 5/257 361/103 |
| 2006/0250114 A1 * | 11/2006 | Faberman | H02K 3/50 322/24 |
| 2006/0284487 A1 | 12/2006 | Tang et al. | |
| 2007/0040534 A1 * | 2/2007 | Ghosh | H02M 7/219 323/207 |
| 2009/0146603 A1 * | 6/2009 | Sihler | H02M 3/158 318/812 |
| 2009/0219737 A1 | 9/2009 | Bjorklund et al. | |
| 2009/0226262 A1 | 9/2009 | Karstad et al. | |
| 2010/0091527 A1 | 4/2010 | Asplund | |
| 2010/0133901 A1 | 6/2010 | Zhang et al. | |
| 2011/0027621 A1 * | 2/2011 | Deane | H01M 10/4235 429/7 |
| 2011/0031816 A1 * | 2/2011 | Buthker | H01L 31/02021 307/82 |

FOREIGN PATENT DOCUMENTS

| | | | |
|---|---|---|---|
| EP | 0868003 B1 | 2/2008 | |
| EP | 1931021 A2 | 6/2008 | |
| GB | 2337366 A | 11/1999 | |
| JP | 06327147 A | 11/1994 | |
| JP | H06327147 A * | 11/1994 | H02J 1/00 |
| KR | 20080098786 A | 11/2008 | |
| WO | WO 2009135730 A1 * | 11/2009 | H02M 7/483 |
| WO | WO 2012038100 A1 * | 3/2012 | H02J 3/36 |

OTHER PUBLICATIONS

Unofficial English Translation of Chinese Office Action issued in connection with corresponding CN Application No. 201180061955.2 dated Dec. 31, 2014.
Invitation to pay Additional Fees from corresponding PCT Application No. PCT/US2011/061415 dated Oct. 5, 2012.
International Search Report and Written Opinion for International Application No. PCT/US2011/061415, dated May 17, 2013.

* cited by examiner

US 10,103,576 B2

METHOD AND SYSTEM FOR CONTROL POWER IN REMOTE DC POWER SYSTEMS

CROSS-REFERENCE TO RELATED APPLICATIONS

This application is a divisional and claims priority to U.S. patent application Ser. No. 12/976,106, filed Dec. 22, 2010 for "METHOD AND SYSTEM FOR CONTROL POWER IN REMOTE DC POWER SYSTEMS", which is hereby incorporated by reference in its entirety and is assigned to the assignee of the present invention.

BACKGROUND OF THE INVENTION

The field of the invention relates generally to remote DC power systems, and more specifically, to a method and system for providing remote control power from a DC power system.

At least some known power systems transmit a DC power current relatively long distances to loads remote from a source of the DC power. Such power systems benefit by using AC control power to supply auxiliaries and control systems proximate the load. However, supplying AC control power through a separate cable increases a cost and complexity of installation and operation of the power system.

BRIEF DESCRIPTION OF THE INVENTION

In one embodiment, a control power supply system includes a first conductor configured to carry a direct current (DC) electrical current from a source to a load, a second conductor configured to carry the DC electrical current from the load to the source, and an AC power source coupled to at least one of the first and the second conductors, the AC power source configured to superimpose a selectable relatively high frequency AC component onto the DC electrical current to generate a composite power signal.

In another embodiment, a method of supplying a control power supply from a DC power cable includes superimposing an AC control power supply voltage onto a DC power cable at a sending station end, extracting the superimposed AC control power supply voltage from the DC power cable at a load station end, and transmitting the AC control power supply voltage to the control power supply.

In yet another embodiment, a power supply system for subsea loads includes a sending station coupled to a first end of a DC power cable. The sending station is positioned above a sea surface and configured to direct a flow of DC current into the DC power cable. The system further includes a load station coupled to a second end of the DC power cable. The load station is positioned below the sea surface and configured to receive the flow of DC current and transmit the DC current to one or more loads. The system also includes a control power supply system including a electrical device electrically coupled in series to the DC power cable proximate the load station and a control power circuit electrically coupled in parallel with at least a portion of the electrical device such that a DC voltage across the at least a portion of the electrical device provides a DC voltage supply to the control power circuit.

BRIEF DESCRIPTION OF THE DRAWINGS

FIG. 1 is a schematic block diagram of a high-current direct current (DC) ring power transmission system in accordance with an exemplary embodiment of the present invention;

FIG. 2 is a schematic block diagram of a control power supply circuit in accordance with an exemplary embodiment of the present invention;

FIG. 3 is a schematic block diagram of a control power supply circuit in accordance with an exemplary embodiment of the present invention;

FIG. 4 is a schematic block diagram of a control power supply circuit in accordance with another exemplary embodiment of the present invention;

FIG. 5 is a schematic diagram of a control power supply system in accordance with an exemplary embodiment of the present invention;

FIG. 6 is a schematic diagram of an exemplary embodiment of a control power supply system that may be used with the system shown in FIG. 4 to supply continuous control power to the system after startup; and FIG. 7 is a graph illustrating a voltage across the ripple filter shown in FIG. 6 over time.

DETAILED DESCRIPTION OF THE INVENTION

The following detailed description illustrates embodiments of the invention by way of example and not by way of limitation. It is contemplated that the invention has general application to analytical and methodical embodiments of supplying a control power supply from a DC power cable over a relatively long distance in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The objective of this invention is to extract the control power from a high-current DC-ring. The DC-ring has a high current rating (e.g. 1 kA) to supply high power loads such as electrical drives for pumps or compressors. Because of the relatively high current flow values the voltage needed to supply control units or other low to medium power auxiliary loads is relatively low. For example, 10 Volts delivered at 1 kiloamps are sufficient to deliver power up to 10 kilowatts.

In embodiments of the present invention, high current diodes are connected in series such that their total forward voltage is sufficient to give the maximum needed power and is also high enough to accommodate proper processing of the auxiliary or control power. Typically, the auxiliary or control load will use less than the current of the high power ring. The excess current is bypassed in the diodes. The control power supply circuit receives its maximum power from the current ring either provided to the load or dissipated in the diodes. The amount of power used for control power represents only a small fraction of the overall distribution system power.

The advantage of this solution is that the diodes very reliably ensure a continuation of the ring current, independent of the down-stream circuits of the auxiliary power supply. Both short and open circuits will not negatively impact the high-current ring. In the exemplary embodiment, the diodes are embodied in press-pack housings and are designed to short-circuit in case of failure. Therefore, the continuity of the current ring is maintained. If more diodes are installed than actually needed to power the auxiliary load, the auxiliary or control power circuit can maintain operation in case of one (or multiple) diode failures.

Figure 1:
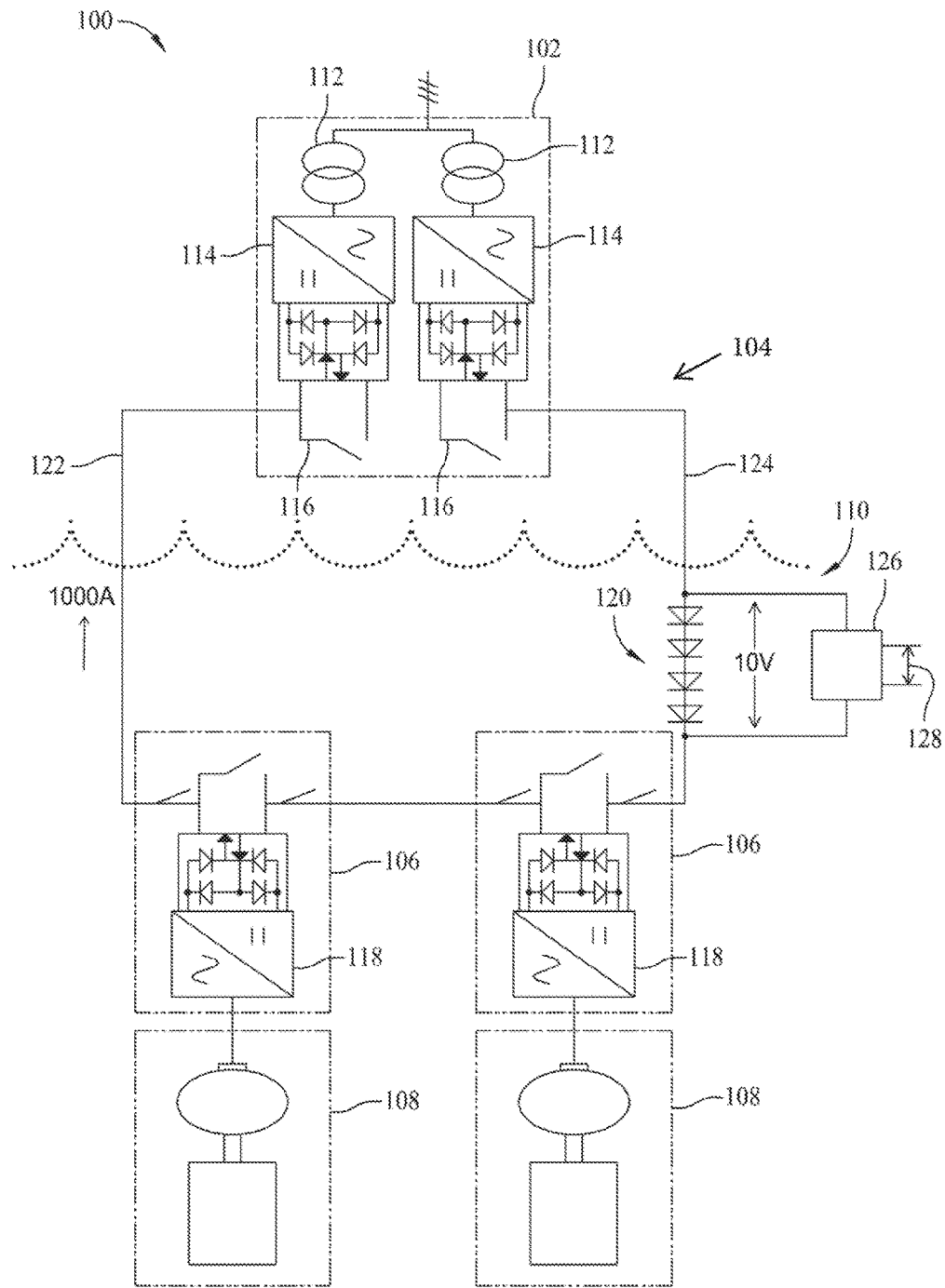
FIGS. 1-7 show exemplary embodiments of the method and system described herein.

FIG. 1 is a schematic block diagram of a high-current direct current (DC) ring power transmission system 100 in accordance with an exemplary embodiment of the present invention. In the exemplary embodiment, DC ring power transmission system 100 includes a sending station 102, a high-current DC power transmission cable 104, one or more load stations 106, one or more loads 108, and a control power supply circuit 110.

Sending station 102 includes one or more transformer sets 112 electrically coupled to electrical converters 114 configured to convert generated alternating current (AC) power to DC power, which is then applied to a DC power transmission cable 104. Switches 116 are coupled in parallel with an output of converters 114 to shunt power around a respective converter 114 if the respective converter 114 is off-line. Switches 116 may also represent a shorter failure mode of converters 114 such that upon failure, converter 114 represents a short circuit to DC ring power transmission system 100 to maintain current flow.

High-current DC power transmission cable 104 electrically couples converters 114 and inverters 118 of respective load stations 106 in a ring configuration. Control power supply circuit 110 is configured to supply control power for components of DC ring power transmission system 100 and includes, in the exemplary embodiment, a plurality of electrical devices, such as, but not limited to, diodes 120 in series with one of wires 122 and 124 of high-current DC power transmission cable 104. In a forward bias direction, diodes 120 each represent a relatively small amount of resistance and therefore a relatively small voltage drop, for example, about 0.7 Volts (V). During operation, a number of diodes in series may be selected to provide a control power supply circuit supply voltage of approximately ten Volts. In one embodiment, a current flowing though wire 124 is about 1000 Amps (A). Accordingly, approximately ten kilowatts of power are available to control power supply circuit 110. One or more low-power DC-DC converters 126 can be electrically coupled to control power supply circuit 110 to adjust a voltage level 128 to any value desired and/or to provide galvanic isolation to the high-current ring configuration.

Figure 2:
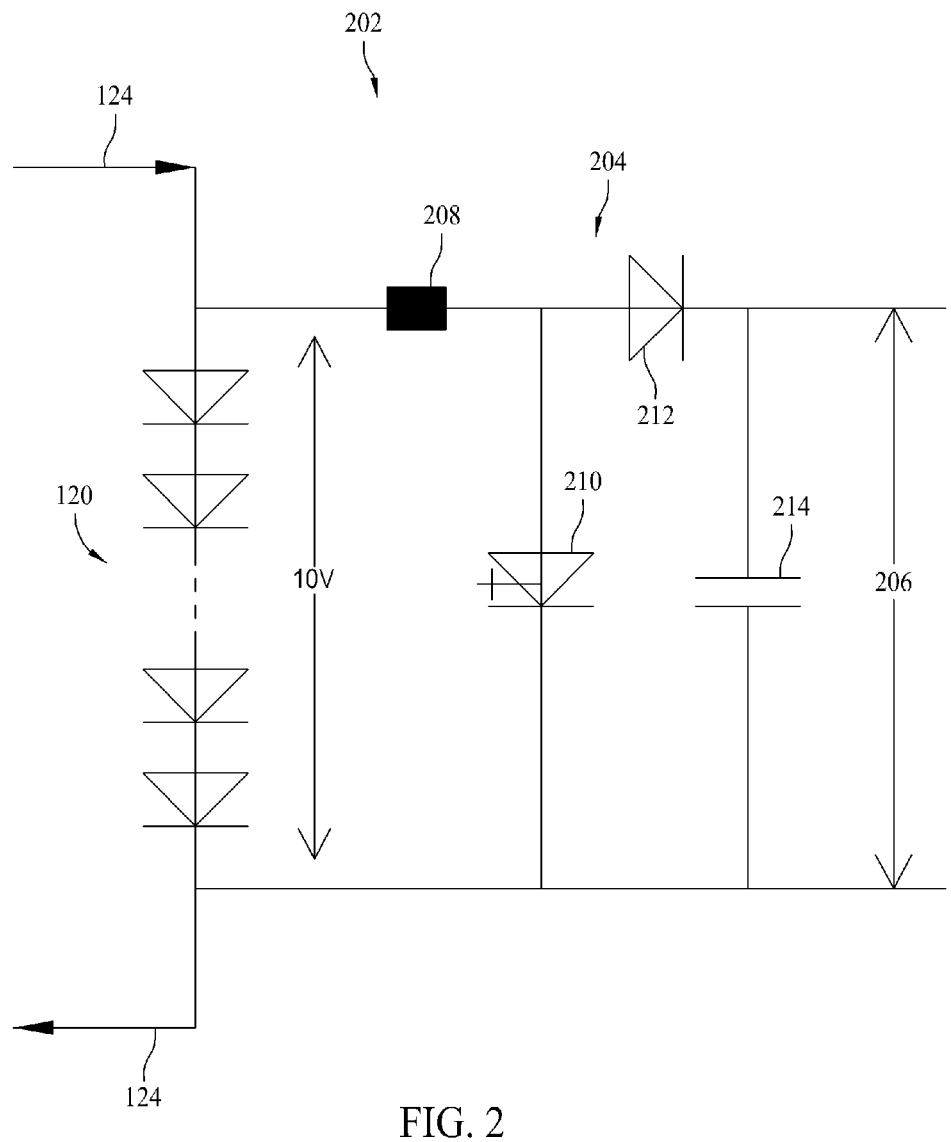

FIG. 2 is a schematic block diagram of a control power supply circuit 202 in accordance with an exemplary embodiment of the present invention. In the exemplary embodiment, control power supply circuit 202 includes diodes 120 (shown in FIG. 1) and a boost (or step-up) converter 204 to increase an output voltage 206 of control power supply circuit 202 from, for example, 10 Volts to approximately 100 Volts. In various embodiments, boost converter 204 is configured to increase output voltage 206 to any desired voltage. Control power supply circuit 202 includes an inductor 208, a switching device 210, such as, but not limited to, an insulated gate bipolar transistor (IGBT) or a gate turn-off thyristor (GTO), a diode 212 and a capacitor 214. Boost converter 204 permits using any voltage level for control power desired based on a selection of the electrical parameters of inductor 208, switching device 210, diode 212 and capacitor 214.

If active switching device 210 is rated for the full high-current DC-ring current value, boost converter 204 can be operated in such a way that its input voltage is lower than the voltage drop of diodes 120 when a lower output power is needed. Using this method, the power dissipation in diodes 120 can be avoided and the efficiency can be improved. The reliability of the overall high-current DC-ring is not negatively affected because diodes 120 would always provide a backup current path as in the standard configuration.

Figure 3:
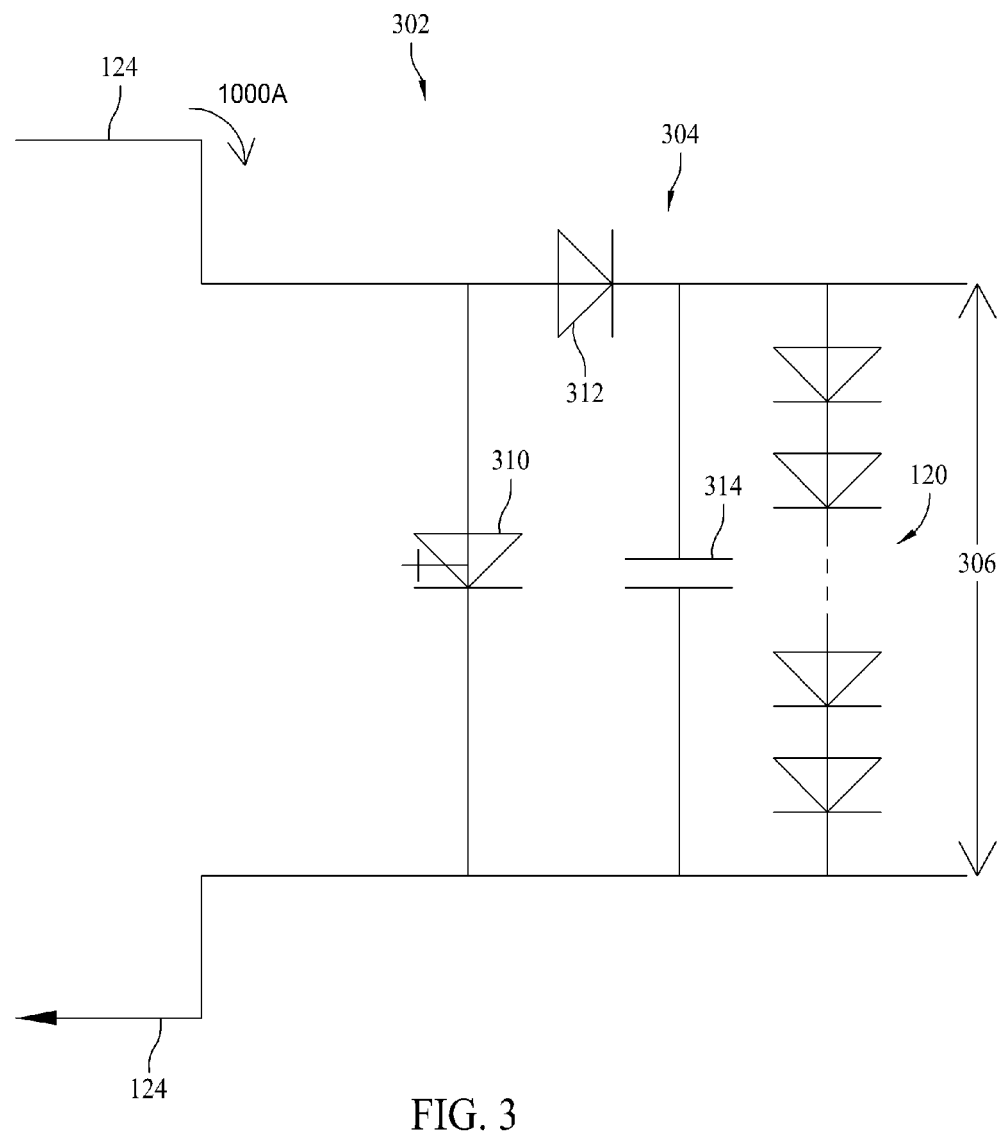

FIG. 3 is a schematic block diagram of a control power supply circuit 302 in accordance with an exemplary embodiment of the present invention. In the exemplary embodiment, control power supply circuit 302 includes diodes 120 (shown in FIG. 1) and a boost (or step-up) converter 304 to increase an output voltage 306 of control power supply circuit 302 from, for example, 10 Volts to approximately 20 Volts. In various embodiments, boost converter 304 is configured to increase output voltage 306 to any desired voltage. Control power supply circuit 302 includes an active switching device 310, such as, but not limited to, an insulated gate bipolar transistor (IGBT) or a gate turn-off thyristor (GTO), a diode 312 and a capacitor 314. Boost converter 304 permits using any voltage level for control power desired based on a selection of the electrical parameters of active switching device 310, diode 312 and capacitor 314. The inductor (inductor 208) used in boost converter 204 of control power supply circuit 202 is omitted in boost converter 304 because the existing and large loop inductance of the high-current DC-ring formed by wires 122 and 124 of high-current DC power transmission cable 104 provide sufficient inductance for the operation of boost converter 304. Diodes 120 ensure a fail-safe integrity of the DC current ring for starting up of boost converter 304 or in case of failure of active switching device 310. In normal operation, output voltage 306 is controlled slightly below a forward voltage drop of diodes 120 to avoid unnecessary losses. To limit the needed number of diodes and their corresponding losses during auxiliary power shutdown/start-up or failure, the output voltage of boost converter 304 is maintained relatively low. If needed by the load, a DC-DC converter can be added to the output of boost converter 304.

An advantage of boost converter 304 is that in applications where the full 10 volts, 1 kiloamp and 10 kilowatt power consumption is not used, boost converter 304 provides a higher efficiency or lower power consumption and a lower power loss from power transmission system 100. To ensure a startup capability boost converter 304 is configured with diodes 120 on an output side so that during startup, active switching device 310 is open so the current passes through diode 312 and series connected diodes 120, which charges boost converter 304 to approximately 20 volts. At least active switching device 310 or diode 312 and diodes 120 are designed to fail shorted to maintain an intact current ring or maintain the current ring active.

Figure 4:
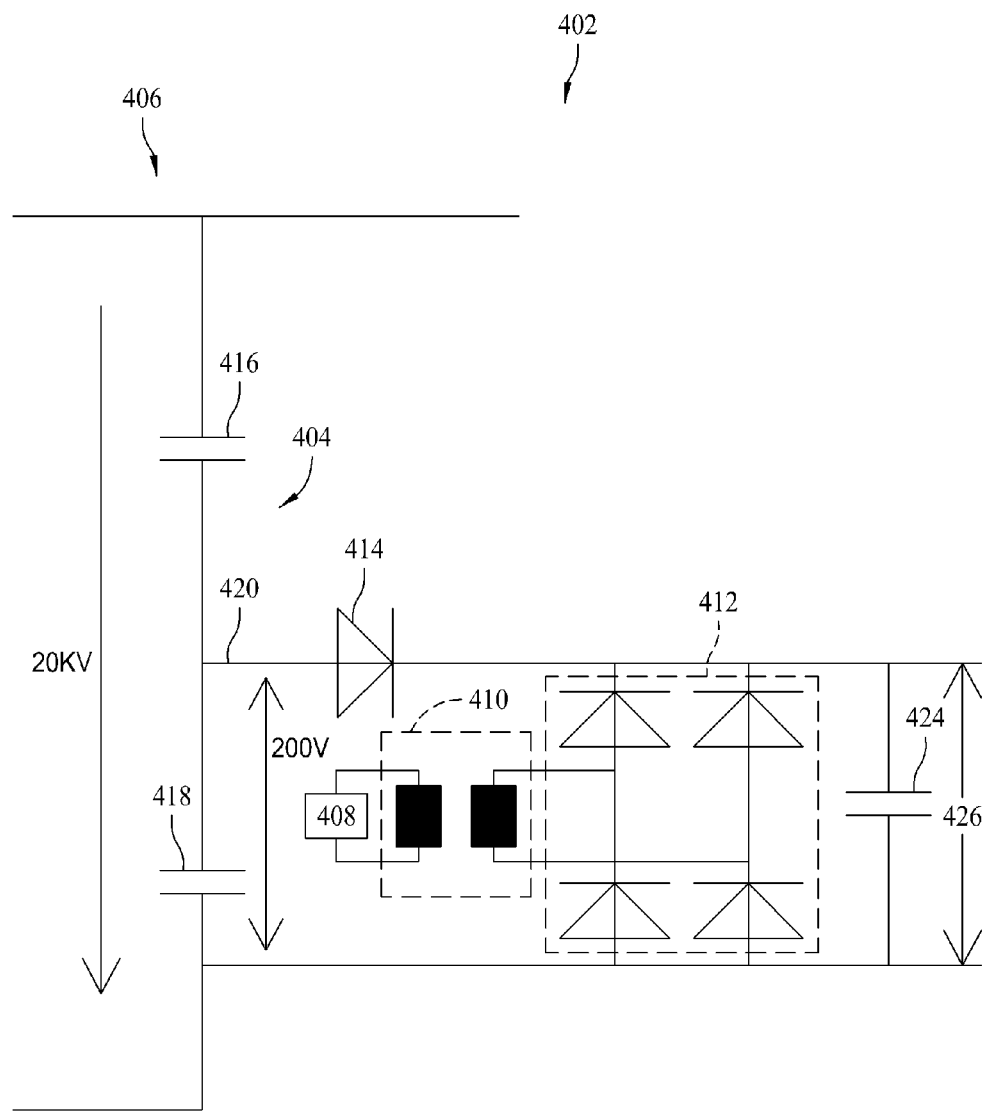

FIG. 4 is a schematic block diagram of a control power supply circuit 402 in accordance with another exemplary embodiment of the present invention. Control power supply circuit 402 provides control and auxiliary power supply from a high voltage DC voltage while starting up power transmission system 100. In the exemplary embodiment, control power for the main converters is normally supplied from a downstream control and auxiliary supply system 408. However, during startup at least a portion of the control power may be supplied through the converter DC-link. Converters 114 include a DC-link that charges to, for example, 20 kV. Converters 114 also need to supply their own control power and specifically converters 114 need to be able to start-up autonomously so that when the rest of power transmission system 100 is not energized, power transmission system 100 still needs some power to set up the controls. During startup, a large single capacitor could supply startup control power but not the control power unless the voltage is reduced. The single large capacitor that could be used is replaced by two capacitors 416 and 418 that form a capacitive voltage divider 404. In the exemplary embodiment, capacitors 416 and 418 do not have the same capacitance values. A capacitance of capacitor 418 is greater than the capacitance of capacitor 416 such that the output voltage 420 (the voltage across capacitor 418) of capacitive voltage divider 404 is a relatively small fraction of the total voltage across capacitive voltage divider 404, for example, approximately 200 volts compared to 20 kV. In various embodiments, a switched mode power supply may be used to further adjust the control power supply voltage as needed.

As described above, the control power is derived from a capacitive voltage divider 404 from a high voltage DC-link 406, which can be part of the existing DC-link capacitor assembly of any of converters 114 and inverters 118 (both shown in FIG. 1). When DC-link 406 is powered up the control power voltage is increased proportionally to the main DC-link voltage, for example, to 200 V of a total 20 kV with a divider ratio of 100:1. When a predetermined voltage is reached on the control power supply, the controller "wakes up" and starts operation of main converter 114 or inverter 118. As part of this process, a second control and auxiliary supply system 408 can start operation from further down-stream. Second control and auxiliary supply system 408 provides power for the control and auxiliaries during normal operation, for example, via a transformer 410 and a diode bridge 412. A diode 414 provides decoupling from capacitive voltage divider 404.

Capacitive voltage divider 404 includes a first capacitor 416 and a second capacitor 418 electrically coupled in series. First capacitor 416 and second capacitor 418 are selected to have ratings that permit sufficient energy to be stored in capacitor 416 to provide a continuous supply of power until the standard power supply is operational.

Capacitive voltage divider 404 provides power during startup. However, once converter 114 is started and power is taken from a capacitor 424 across an output 426 of control power supply circuit 402, capacitor 424 will slowly discharge and capacitor 418 may also discharge to zero volts while capacitor 416 charges to the full 20 kV.

After the startup phase, power from second control and auxiliary supply system 408 is used to maintain control power for converter 114.

Figure 5:
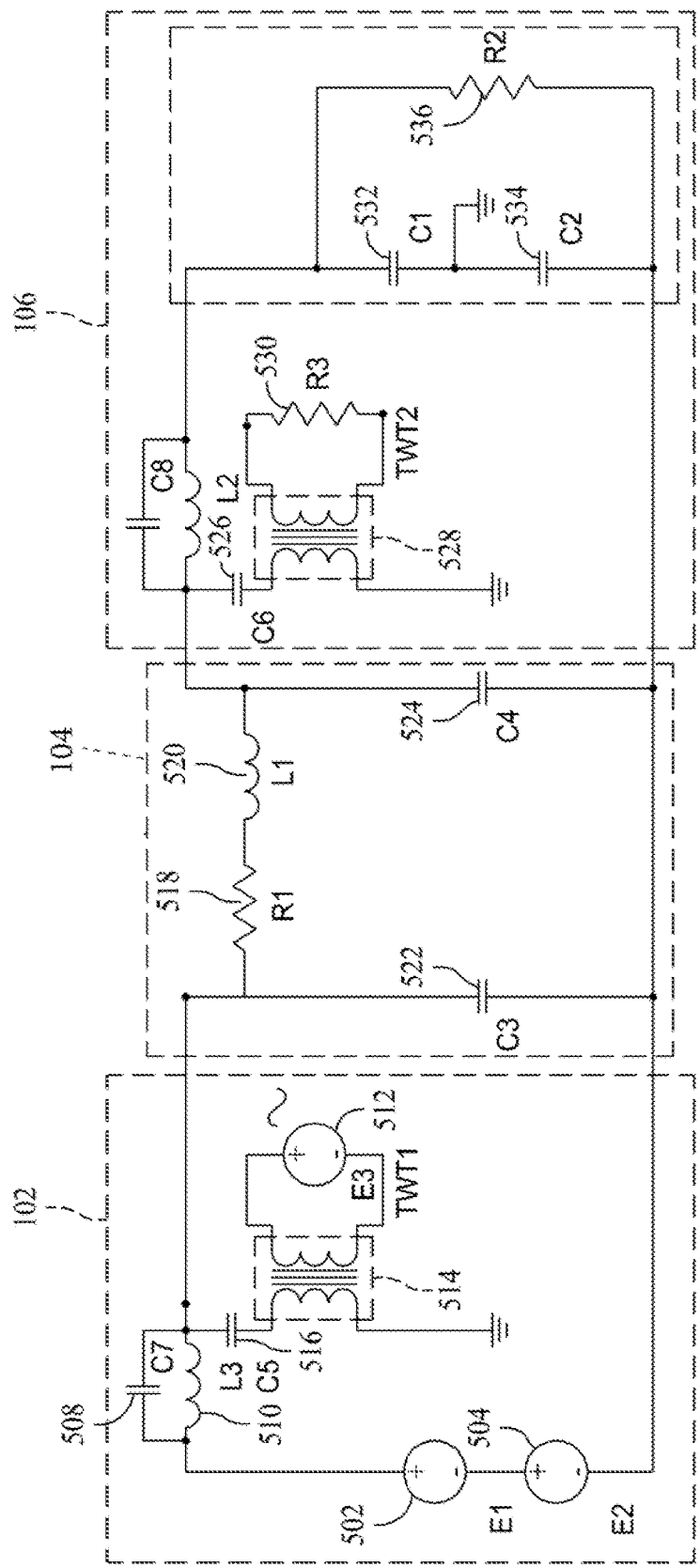

FIG. 5 is a schematic diagram of a control power supply system 500 in accordance with an exemplary embodiment of the present invention. In the exemplary embodiment, a low voltage, low power transmission is injected onto the same cable that would transmit a high power source to converters 114 and inverters 118. Control power supply system 500 includes one or more DC sources 502 and 504 that may have an amount of an AC ripple component along with the DC power. A filter 506, comprising a capacitor 508 and an inductor 510, removes a significant portion of the AC ripple that may be a component of the DC power. An AC source 512 is configured to superimpose a relatively high frequency AC power component from AC source 512 onto the DC power. AC source 512 is isolated through transformer 514 and a capacitor 516. A frequency of AC source 512 may be selectable and/or variable based on the application and characteristics of the powered components. In one embodiment, a power grid frequency may permit readily available power from the grid to be supplied or a frequency may be selected to minimize interference with other signal superimposed on the line.

The composite DC power signal and AC power signal are transmitted over cable 104, represented in FIG. 5 by resistor 518, inductor 520, and capacitors 522 and 524. At load station 106, a capacitor 526 is configured to pass only the AC component of the composite power signal to a step-down transformer 528 to generate an isolated control power voltage level that is compatible with the installed equipment at load station 106, represented by a resistor 530. A capacitor 532, a capacitor 534, and a resistor 536 represent load inverter 118 and/or load 108.

Figure 6:
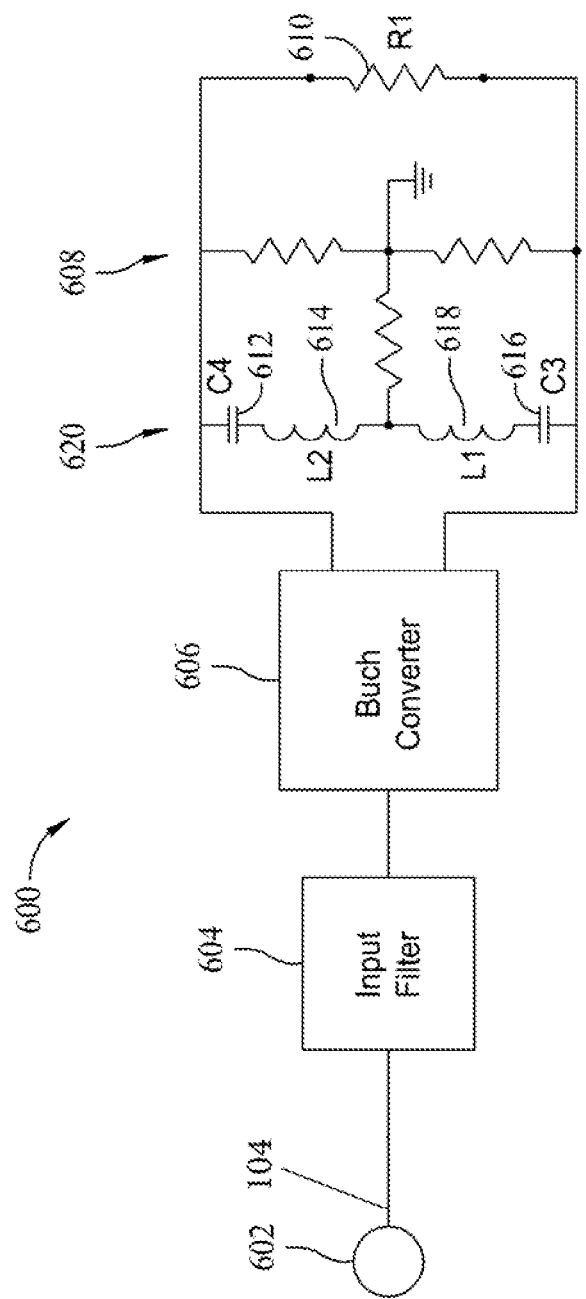

FIG. 6 is a schematic diagram of an exemplary embodiment of a control power supply system 600 that may be used with control power supply circuit 402 (shown in FIG. 4) to supply continuous control power to control power supply circuit 402 after startup. In the exemplary embodiment, control power supply system 600 includes an electrical source 602 electrically coupled to an input filter 604 through cable 104. A buck converter 606 is configured to step-down the voltage from electrical source 602 from approximately 100 kilovolt transmitted through cable 104 to a voltage, which is more practical to use locally, for example, 10 kilovolts. Buck converter 606 includes a plurality of electronic switches, such as, but not limited to, IGBTs, and diodes. A switching action of such devices chops the DC link voltage and/or adds an AC ripple to the DC power on cable 104. Although the switching effects are normally undesirable because they present difficult to account for heating and/or magnetic flux concentration issues for components supplied by the DC power, the ripple may be "harvested" and filtered to provide a source of control power without using an additional control power cable.

A ripple filter 608 is configured to receive the output of buck converter 606 and filter the AC ripple component of the output, which can then be used to supply, for example, control and auxiliary supply system 408 (shown in FIG. 4) and represented by resistor 610. In the exemplary embodiment, ripple filter comprises a plurality of static components electrically coupled in a filter network. Specifically, a capacitor 612 is series connected to an inductor 614 and a capacitor 616 is series connected to an inductor 618 forming a voltage divider 620.

Figure 7:
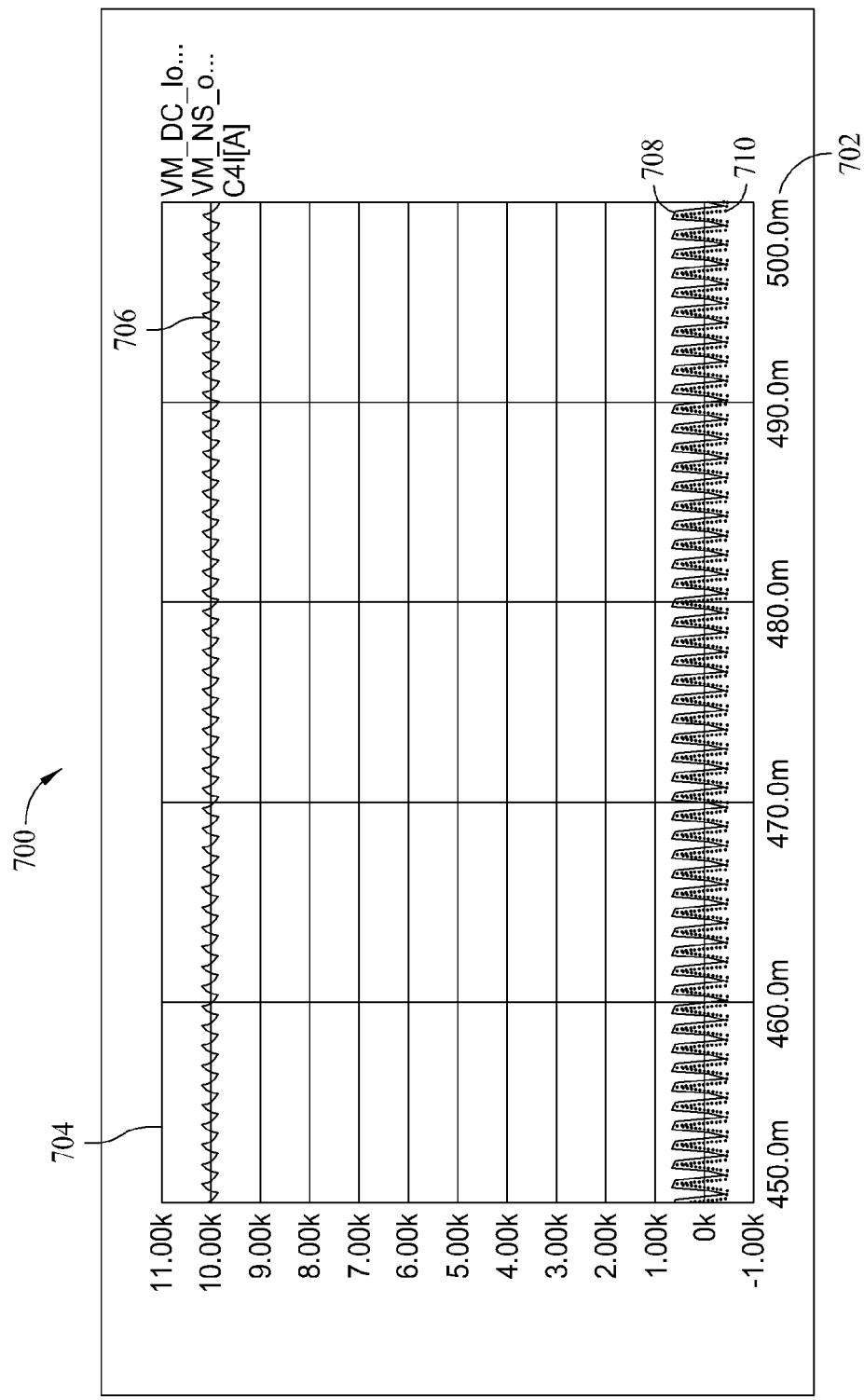

FIG. 7 is a graph 700 illustrating a voltage across ripple filter 608 (shown in FIG. 6) over time. In the exemplary embodiment, graph 700 includes an x-axis 702 graduated in units of time and a y-axis 704 graduated in units of voltage. A DC link buck power voltage trace 706 illustrates the AC switching action induced ripple component together with the DC supply power component as received by ripple filter 608. A filter voltage trace 708 illustrates a ripple voltage across filter capacitor 612 and a trace 710 illustrates a current through inductor 614.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is providing a source for a control power circuit for a subsea load station from a relatively high-current direct current supply without running a separate control power cable. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of using a series electrical device provides a cost-effective and reliable means for providing control power to a load station remote from a source of AC power using a DC current supplied to a remote load. More specifically, the methods and systems described herein facilitate providing control power to a load a relatively long distance from a source without using a dedicated separate cable. As a result, the method and systems described herein facilitate operating subsea equipment in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A control power supply system comprising:
   a first conductor configured to carry, a direct current (DC) electrical current from a source to a load;
   a second conductor configured to carry the DC electrical current from the load to the source;
   a plurality of diodes coupled in series with at least one of the first conductor and the second conductor, wherein the plurality of diodes is configured to fail in a shorted condition such that failure of the plurality of diodes maintains a direct current (DC) ring bus; and
   an AC power source coupled to at least one of said first and said second conductors, said AC power source configured to superimpose a selectable relatively high frequency AC component onto said DC electrical current to generate a composite power signal.

2. The control power supply system in accordance with claim 1, further comprising a filter network configured to extract the superimposed AC component from the DC electrical current.

3. The control power supply system in accordance with claim 2, wherein said filter network comprises a transformer configured to generate an isolated control power voltage level using the superimposed AC component of the composite power signal.

4. A control power supply system comprising:
   a first conductor configured to carry a direct current (DC) electrical current from a source to a load;
   a second conductor configured to carry the DC electrical current from the load to ti source;
   a plurality of diodes coupled in series with at least one of the first conductor and the second conductor, wherein the plurality of diodes is configured to fail in a shorted condition such that failure of the plurality of diodes maintains a direct current (DC) ring bus;
   a buck converter configured to step-down voltage using a plurality of semiconductor switches, wherein the plurality of semiconductor switches generates an AC ripple current by switching action; and
   a ripple filter electrically coupled to an output of said buck converter, said ripple filter configured to filter the AC ripple component of the output of said buck converter and transmit the filtered output to a control and auxiliary supply system.

5. The control power supply system in accordance with claim 4, further comprising a voltage divider comprising at least one of capacitors, inductors, and a combination thereof.

6. A method of supplying a control power supply from a DC power cable, said method comprising:
   superimposing an AC control power supply voltage onto a DC power cable at a sending station end;
   extracting the superimposed AC control power supply voltage from the DC power cable at a load station end, wherein a plurality of diodes is coupled in series with the DC power cable, wherein the plurality of diodes is configured to fail in a shorted condition such that failure of the plurality of diodes maintains a direct current (DC) ring bus; and
   transmitting the AC control power supply voltage to the control power supply.

7. A power supply system for subsea loads, said power supply system comprising:
   a sending station coupled to a first end of a DC power cable, said sending station positioned above a sea surface and configured to direct a flow of DC current into said DC power cable;
   a load station coupled to a second end of the DC power cable, said load station positioned below said sea surface and configured to receive the flow of DC current and transmit the DC current to one or more loads;
   a plurality of diodes coupled in series with the DC power cable, wherein the plurality of diodes is configured to fail in a shorted condition such that failure of the plurality of diodes maintains a direct current (DC) ring bus using the DC power cable; and
   a control power supply system powered from said DC power cable proximate to said load station and configured to provide a DC voltage supply to a control power circuit.

8. The power supply system in accordance with claim 7, wherein said control power circuit comprises an active switching device configured to facilitate converting the DC voltage at a first level to a DC voltage at a second level different from the first level.

9. The rower supply system in accordance with claim 7, further comprising a capacitive voltage divider configured to supply start-up power to said control power circuit and a second auxiliary power supply configured to supply operating power to said control power circuit.

10. The power supply system in accordance with claim 9, further comprising:

the plurality of diodes electrically coupled in series with said DC power cable, each said diodes configured to only fail in a shorted condition such that failure of any of the diodes maintains a direct current (DC) ring bus using said DC power cable;

a buck converter configured to step-down voltage using a plurality of semiconductor switches wherein the plurality of semiconductor switches generates an AC ripple current by switching action; and a ripple filter electrically coupled to an output of said buck converter, said ripple filter configured to filter an AC ripple component of the output of said buck converter and transmit a filtered output to a control and auxiliary supply system.

11. The power supply system in accordance with claim 7, further comprising an AC power source coupled to the DC power cable, said AC power source configured to superimpose a selectable relatively high frequency AC component onto said the DC power cable to generate a composite power signal.

12. The power supply system in accordance with claim 11, further comprising a filter network configured to extract a superimposed AC component from the DC electrical current.

\* \* \* \* \*